US012568086B2

(12) United States Patent
Agarwal et al.

(10) Patent No.: US 12,568,086 B2
(45) Date of Patent: Mar. 3, 2026

(54) AUTOMATIC SECURITY COVERAGE EXPANSION OF CLOUD SECURITY POSTURE MANAGEMENT (CSPM) ASSETS

(71) Applicant: Palo Alto Networks, Inc., Santa Clara, CA (US)

(72) Inventors: Ankit Agarwal, Bangalore (IN); Vivek Hari Menon, Kochi (IN); Akshay Raghunandan, Bengaluru (IN); Pranav Rai, Bengaluru (IN)

(73) Assignee: Palo Alto Networks, Inc., Santa Clara, CA (US)

( * ) Notice: Subject to any disclaimer, the term of this patent is extended or adjusted under 35 U.S.C. 154(b) by 165 days.

(21) Appl. No.: 18/616,447

(22) Filed: Mar. 26, 2024

(65) Prior Publication Data

US 2025/0310331 A1     Oct. 2, 2025

(51) Int. Cl.
*H04L 29/06* (2006.01)
*H04L 9/40* (2022.01)

(52) U.S. Cl.
CPC .................................... *H04L 63/10* (2013.01)

(58) Field of Classification Search
CPC ......... H04L 63/10; H04L 63/20; H04L 63/08; H04L 63/0227; H04L 63/0263; H04L 63/1433
See application file for complete search history.

(56) References Cited

U.S. PATENT DOCUMENTS

2023/0208869 A1\*  6/2023  Bisht ........................ G06N 7/01
                                                726/23
2025/0208936 A1\*  6/2025  Danino ................. G06F 11/008

\* cited by examiner

*Primary Examiner* — Longbit Chai
(74) *Attorney, Agent, or Firm* — Gilliam IP PLLC

(57)     ABSTRACT

A system has been created to automatically expand CSPM coverage for an organization based on CSP offerings and organization usage of cloud resources. The system crawls API specifications of each CSP used by an organization to extract cloud resource metadata including attributes and attribute descriptions. The system classifies each discovered attribute as related to security or not related to security. The system then filters out those security related attributes that already have CSPM coverage. The system collects information across different data sources corresponding to CSPM for the organization, such as audit logs and ingestion requests. The system then prioritizes resource attributes for metadata ingestion based on configurable parameters that consider newly discovered CSP offerings represented by discovered security related attributes. According to the prioritization, the system generates templates to execute for ingestion.

20 Claims, 5 Drawing Sheets

AUTOMATIC SECURITY COVERAGE EXPANSION OF CLOUD SECURITY POSTURE MANAGEMENT (CSPM) ASSETS

BACKGROUND

The disclosure generally relates to cloud computing (e.g., CPC subclass G06F 16/00) and cloud security (e.g., CPC subclass G06F 21/00).

Cloud service providers/platforms (CSPs) provide cloud computing technology that deliver computing resources in the cloud. With cloud computing, applications and other computing resources traditionally hosted on-premises are delivered by a CSP over the Internet. CSPs offer Anything-as-a-Service (XaaS) solutions, such as Infrastructure-as-a-Service (IaaS), Platform-as-a-Service (PaaS), and Software-as-a-Service (SaaS), which provide cloud-based infrastructure, cloud-based platforms, and cloud-based applications, respectively. A variety of vendors of hardware technology and software technology employ the services of CSPs for hosting technology in the cloud instead of or in addition to on-premises as hardware and software have traditionally been delivered. End users of a CSP, including such vendors of cloud-delivered technology, can interact with the CSP via application programming interfaces (APIs) of the CSP. Cloud APIs provide an interface for managing computing resources or utilizing the services of a CSP. To inform end users of the available functionality of the CSP that can be invoked via the cloud API exposed by the CSP, the CSP provides documentation for the cloud API that indicates functions of the cloud API, the associated request and response parameters, and any corresponding descriptions.

Cloud security posture management (CSPM) refers to management of security risks of cloud infrastructure, cloud infrastructure encompassing the software and hardware resources of a CSP. For a customer of a CSP, CSPM refers to management of the security risks to customer cloud assets (i.e., application(s), workload, and/or data). While the CSP is responsible for CSPM of the infrastructure provided by the CSP, the CSPM of customer assets involves monitoring assets for risks and compliance auditing based on policy definitions, scanning to ensure policy compliance, and remediation of detected risks. Scanning or searching for risks, such as misconfigurations, can be across cloud environments/infrastructure of different delivery models including IaaS, PaaS, and SaaS.

The Stanford Institute for Human-Centered Artificial Intelligence created an interdisciplinary initiative named the Center for Research on Foundation Models. They coined the term "foundation models" to refer to machine learning models "trained on broad data at scale such that they can be adapted to a wide range of downstream tasks." Some models considered foundation models include BERT, GPT-4, Codex, and LLAMA. Foundation models are based on artificial neural networks including generative adversarial networks (GANs), transformers, and variational encoders. Many large language model are considered foundation models.

BRIEF DESCRIPTION OF THE DRAWINGS

Embodiments of the disclosure may be better understood by referencing the accompanying drawings.

DESCRIPTION

Figure 1:
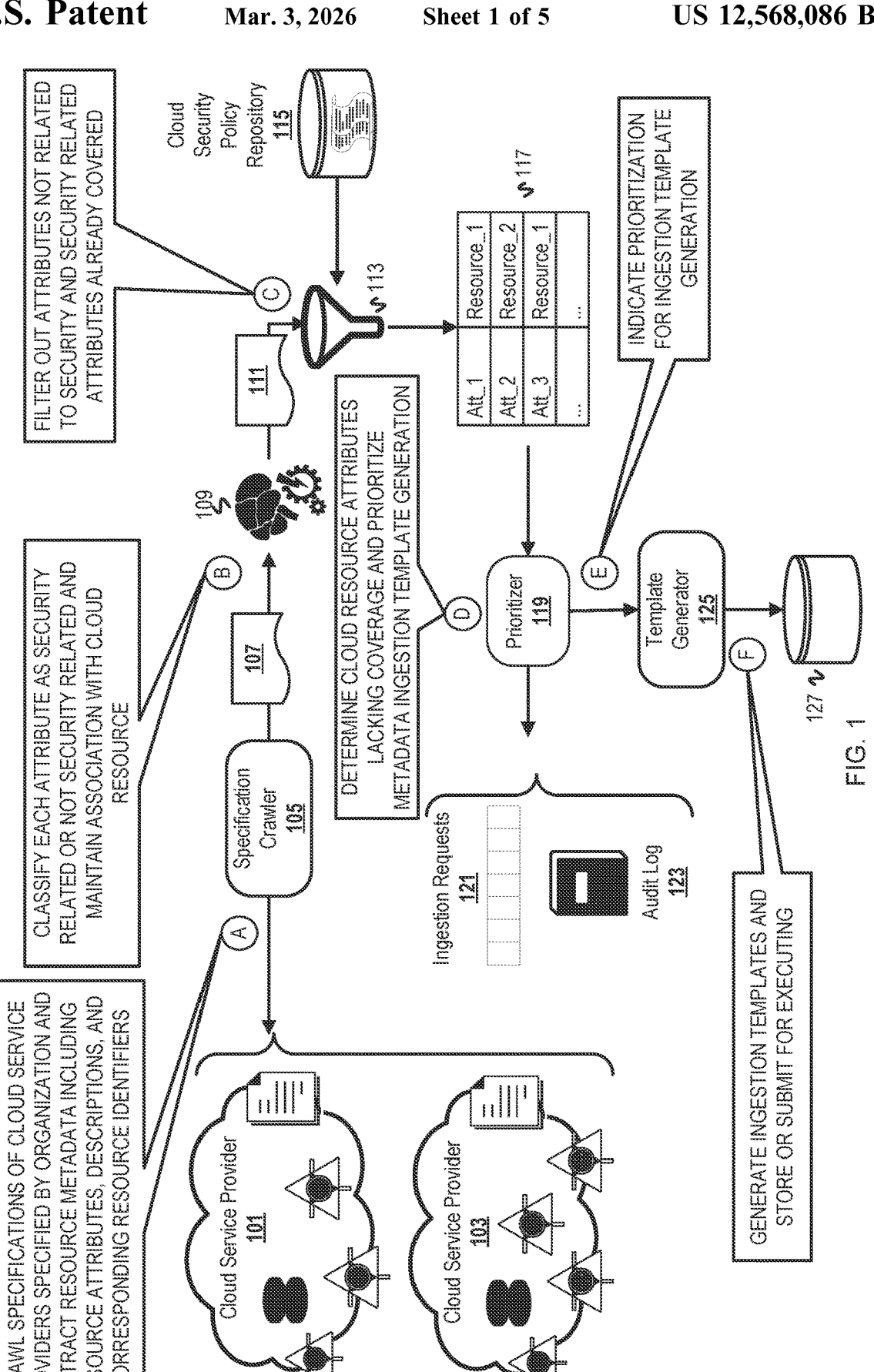
FIG. 1 is a diagram of a system that manages metadata ingestion for CSPM coverage based on an organization's use of cloud resources and updates/releases from CSPs.

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses shorthand terms related to cloud technology for efficiency and ease of explanation. The term "cloud resource" refers to an entity (e.g., object or service) that has a network address that can be used as an endpoint for a network connection. The entity may be a physical device (e.g., a server), a service (e.g., Software-as-a-Service), or may be a virtual entity (e.g., virtual server or virtual storage device). In more general terms, a cloud resource accessible to customers is a resource owned/managed by the CSP that is provisioned and/or used by a customer and is accessible via network connections. Often, the access is in accordance with an API or software development kit provided by the CSP.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

End users of a CSP (e.g., an organization) can use an in-house team and/or third party security provider for CSPM. A third party security provider offers a cloud-native solution (e.g., service or platform) to a CSP end user. The CSP end user can use the cloud-native solution as a self-service solution for CSPM or the solution can include security expertise of the security provider. Regardless of who is responsible for CSPM, effectiveness of CSPM partly depends upon knowing cloud assets (i.e., cloud resources provisioned to and/or used by the end user). To maintain knowledge of cloud assets for CSPM monitoring, a cloud-native CSPM solution uses a CSP's API to discover assets and ingest asset metadata into a CSPM database. However, CSPs frequently offer new services and technologies, and an organization often has assets across multiple CSPs. Furthermore, a CSP end user will typically employ a CSPM solution after a dynamic footprint has been established across CSPs (e.g., after already provisioning assets and providing its own application(s) or service(s) with CSP resources). Thus, the CSPM solution begins with a gap in knowledge. Despite ongoing discovery of cloud assets, many services of a CSP for an end user will lack CSPM coverage or have little coverage.

A system has been created to maintain a current and comprehensive view of cloud resource metadata and prioritize ingestion of cloud resource metadata based on the current and comprehensive view and end user usage, as well as prioritization factors. The system includes a specification crawler, CSPM policy repository, classifier, prioritizer, and template generator. For CSP offerings, the crawler crawls API specifications of each CSP used by an end user to extract cloud resource metadata including attributes and attribute descriptions. The crawler feeds the attributes and attribute descriptions to the classifier, which has been trained to classify an attribute as related to security or not related to security. The system then filters out those security related attributes that are already known based on the assets indicated in CSPM policies. This identifies security related attributes of newly offered CSP services/technologies. For end user usage (also referred to herein as usage context), the prioritizer of the system collects information across different data sources corresponding to CSPM for the end user, such as audit logs and ingestion requests. The prioritizer then prioritizes resources for metadata ingestion based on configurable parameters that consider newly discovered CSP offerings represented by discovered security related attributes. According to the prioritization, the template generator generates templates that specify discovered resources, API calls to obtain metadata of the resources, and how to transform the metadata. The system executes the generated templates and ingests the transformed metadata into a CSPM database.

Example Illustrations

FIG. 1 is a diagram of a system that manages metadata ingestion for CSPM coverage based on an organization's use of cloud resources and updates/releases from CSPs. An organization will often use resources from multiple CSPs. Thus, FIG. 1 illustrates a CSP 101 and a CSP 103 with resources used by an organization. The CSPs 101, 103 are depicted with various cloud resource offerings and specifications corresponding to those resources. An organization does not necessarily use all offerings of a CSP and may use cloud resources that could be considered redundant between CSPs. The system that manages metadata ingestion for CSPM coverage includes a specification crawler 105, a classifier 109, a filter 113, a prioritizer 119, and a template generator 125. As examples of data sources with information that represents an organization's current use, FIG. 1 depicts a queue 121 of ingestion requests and an audit log 123. The queue 121 and the audit log 123 are independent of the metadata ingestion management system but accessible by the metadata ingestion management system. In addition, the metadata ingestion management system also accesses a cloud security policy repository 115 that is independent of the ingestion management system. Although this system may be part of or separate from the system that runs the ingestion templates generated by this system, FIG. 1 depicts a repository 127 as a destination for generated ingestion templates.

FIG. 1 is annotated with a series of letters A-F each of which represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the specification crawler 105 crawls specifications of CSPs 101, 103 to extract metadata of cloud resources. The crawler 105 will have been configured to crawl domains of the CSPs 101, 103 or read a file that specifies domains and/or uniform resource locators (URLs) to crawl. The specifications found at the domains or URLs include API specifications, CSP specifications, and/or resource specifications. Based on the crawling, the specification crawler 105 determines specification updates, with updates being changes to specifications or new specifications. The crawler 105 extracts metadata corresponding to the detected updates. As examples, the metadata includes resource names/identifier, attributes of the resources, and descriptions of the attributes.

At stage B, the classifier 109 classifies attributes indicated by the specification crawler 105. The specification crawler 105 or a data pre-processing pipeline associated with the classifier 109 transforms the metadata extracted by the specification crawler 105 into attributes and attribute descriptions 107 that can either be accepted by the classifier 109 or converted into feature vectors for the classifier 109. The system maintains a data structure that maps each feature vector with a cloud resource identifier to maintain the association between cloud resource and attribute and propagate that association to the classification output 111 of the classifier 109. This data structure can be maintained by a process or thread associated with the classifier 109 (e.g., wrapper code or interface code that facilitates interaction with the classifier 109) or program code that orchestrates the tasks of the various components of the system (i.e., the crawler, prioritizer, etc.).

At stage C, the filter 113 filters out attributes that are not related to security and security related attributes already covered. The filter 103 uses the classification output 111 to remove from consideration those of the discovered attributes that are not related to security. The filter 113 also uses data from a cloud security repository 115 to remove from consideration security related attributes discovered from the crawling that are already included in the CSPM coverage. The filter 113 queries the cloud security policy repository 115 for each of the discovered attributes that have been classified as related to security. If found in the cloud security policy repository 115, then the attribute is already covered by a security policy. The filtering yields filtered attributes 117. The example of filtered attributes 117 is illustrated as a data structure that associates each uncovered, discovered security related attribute with its corresponding cloud resource.

At stage D, the prioritizer 119 determines cloud resource attributes that lack CSPM coverage and then prioritizes metadata ingestion template generation accordingly. Ingestion of cloud resource attribute metadata is driven by executing ingestion templates. The templates are generated in a manner that reflects prioritization as determined by the prioritizer 119. The prioritizer 119 queries usage data sources, in this illustration the ingestion requests queue 121 and the audit log 123, for indications of cloud resource attributes. The audit log 123 is usually maintained by the CSP and indicates actions on cloud accounts showing usage activity, such as creating a storage resource, deleting a virtual machine, adding a policy, etc. The ingestion requests queue 121 is a queue of requests for cloud resource attributes to be covered by CSPM. Customers and policy experts will submit these requests to specifically request coverage expansion. This and other data sources that represent explicit requests to expand CSPM coverage are likely assigned high prioritization. The prioritizer 119 can access data sources of other or additional ticketing systems. The audit log 123 is a log generated from security scans that identify misconfigurations and/or vulnerabilities of cloud resources. The presence of cloud resource attributes in these usage data sources indicates that the cloud resource attributes are not covered and that there is some urgency. If there is an indication of a cloud resource attribute in an audit log, then a vulnerability exists. If an ingestion request is pending, then there is an indication that a user expects the attribute to be covered.

At stage E, the prioritizer 119 indicates the cloud resource attributes and prioritization to the template generator 125 for ingestion template generation. The prioritizer 119 can assign a weight to each of the cloud resource attributes by source. For instance, the filtered cloud resource attributes 117 can be assigned a weight representing highest priority and the cloud resource attributes indicated in the audit log 123 be assigned a weight representing next highest priority.

At stage F, the template generator 125 generates an ingestion template for each cloud resource attribute indicated by the prioritizer 119. The template generator 125 generates these templates according to prioritization communicated by the prioritizer 119. An ingestion template is the same as an ETL template or Extract, Transform, Load template. Continuing with the previous example, the template generator 125 first generates ingestion templates for the filtered cloud resource attributes 117. The template generator 125 loads an ingestion template that includes placeholders. The template generator then populates the placeholders with information for ingesting metadata of an identified cloud resource attribute. The template generator 125 will populate the ingestion template at least with a cloud resource identifier, a cloud attribute identifier/name, and a location for retrieving metadata of the cloud resource identifier (e.g., a URL). As each ingestion template is generated, the template generator 125 submits the ingestion template for execution. For example, the template generator 125 can write the ingestion template to a repository 127 that is read by a scheduler. Below is an example ingestion template.

```
schemaVersion: v1
id: examplemanage-ai
version: 1
csp: csp123
permissionsRequired:
- notebooks.runtimes.list
isMandate: true
name: notebook-runtime
description: Lists all ExampleManage AI Runtime Environments
toolUsed: manual
tags:
releaseVersion:
#https://cloud.csp123.com/examplemanage-
ai/docs/workbench/reference/rest/v1/projects.locs.runtimes/list
scope: non-regional
pipeline:
-id: api-response--list-runtimes
    type: api
    service: notebooksv1
    action: notebooks.projects.locations.runtimes.list
pathParams:
    locationsId: "-"
    -id: query--list-of-runtimes
    type: jmes-path
    data: api-response--list-runtimes
    query: runtimes
    -id: iterate-over--list-of-runtimes
    type: iterate
    data: query--list-of-runtimes
    item: single-runtime
pipeline:
    -id: query--runtime-full-name
    type: jmes-path
    data: single-runtime
    query: name
    -id: runtime-short-name
    type: regex-extract
```

-continued

```
    data: query--runtime-full-name
    pattern: (?<runtimeName>(?<=runtimes/).+)
capture:
- runtimeName
-id: runtime-region
    type: gcp-region-extractor
    data: query--runtime-full-name
    -id: collect-resource--runtime
    type: collect-resource
    data: single-runtime
    resourceType: notebook-runtime
extractionPaths:
    resourceId:
    - name
    resourceName:
    - ${runtime-short-name.runtimeName}
    resourceRegion: runtime-region.region
    excludeFields:
    - updateTime
```

This example ingestion template already identifies a CSP as csp123 and has a few other parameters set. The template generator 125 can determine a CSP for a set of cloud resource attributes and load an ingestion template that has been written for the CSP. Alternatively, the template generator 125 can load a CSP agnostic template and populate the CSP field based on the data communicated by the prioritizer 119. The ingestion template will also indicate one or more transform operations to perform to metadata retrieved from locations identified in the ingestion template to conform to formatting and be compatible for loading into a repository for CSPM metadata, such a data warehouse or data lake.

Figure 2:
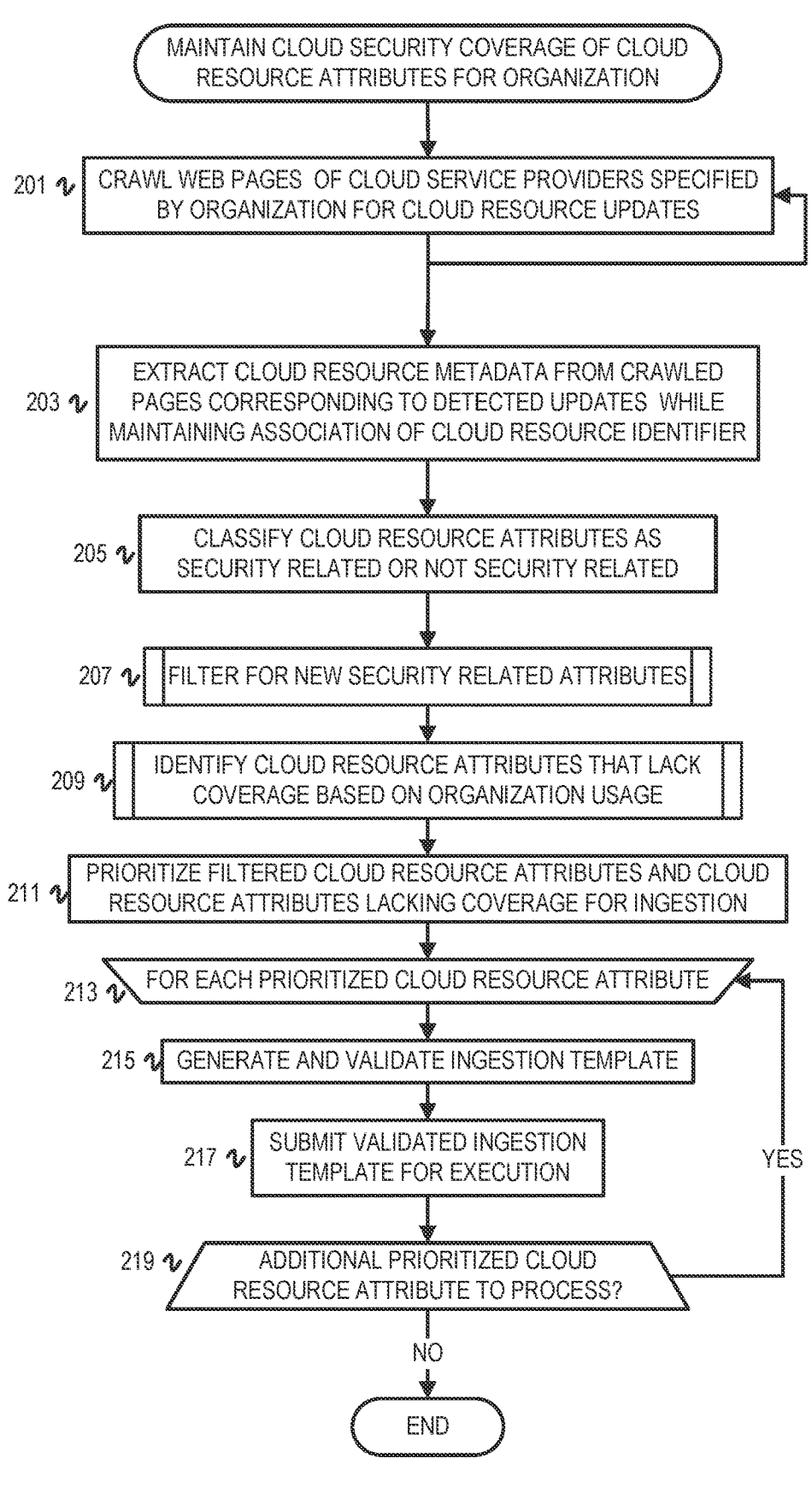
FIG. 2 is a flowchart of operations for maintaining cloud security coverage of cloud resource attributes for an organization.
Figure 3:
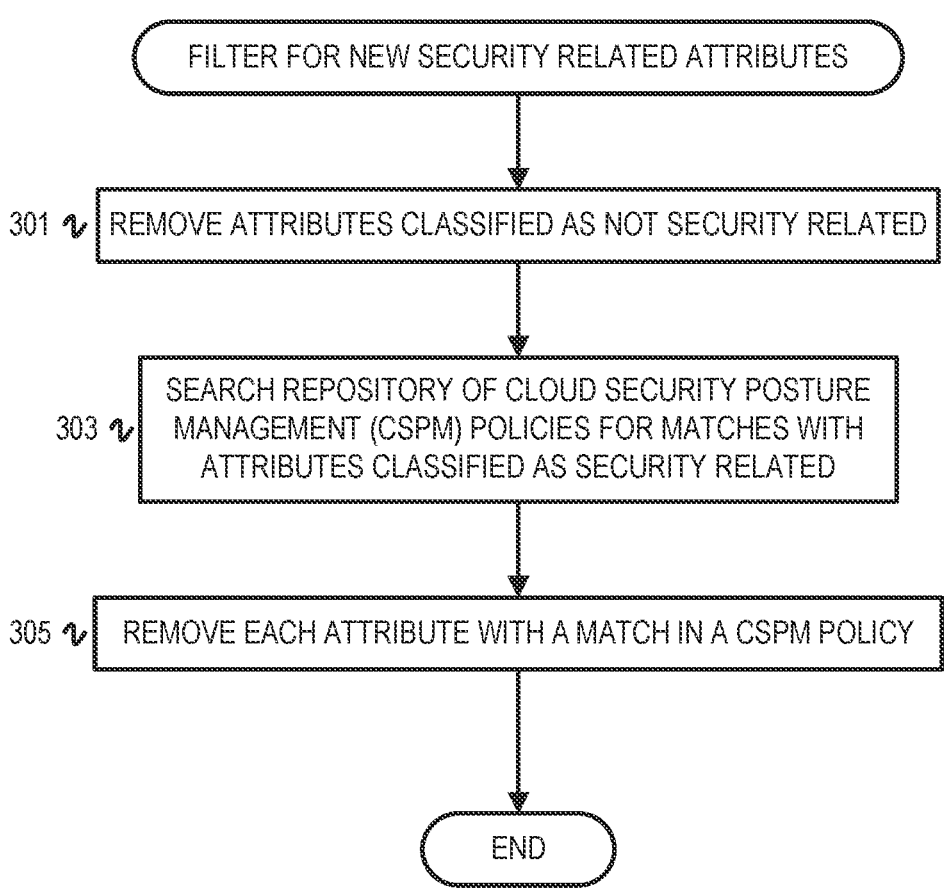
FIG. 3 is a flowchart of example operations to filter for new security related attributes.
Figure 4:
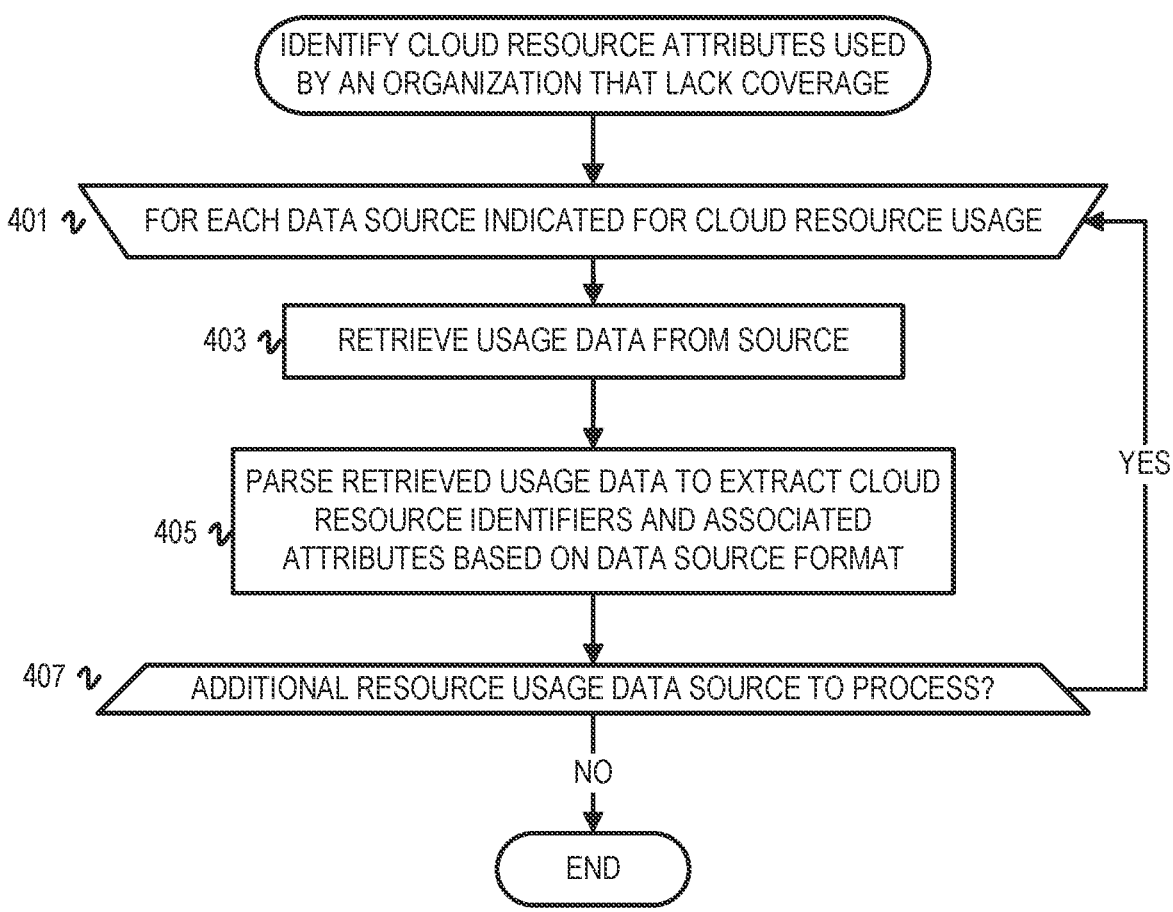
FIG. 4 is a flowchart of example operations for identifying cloud resource attributes used by an organization that lack coverage.

FIGS. 2-4 are flowcharts of example operations corresponding to managing metadata ingestion for CSPM coverage. The example operations are described with reference to a metadata ingestion management system for consistency with FIG. 1 and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of operations for maintaining cloud security coverage of cloud resource attributes for an organization. Although the example operations are described with reference to a metadata ingestion management system, the operations are likely organized by different components that can execute asynchronously, such as the crawling functionality and the prioritization functionality. For instance, items (e.g., cloud resource attributes identified as lacking coverage or discovered cloud resources) can be accumulated at one or multiple points within the process.

At block 201, the metadata ingestion management system crawls web pages of cloud service providers' API specifications specified by an organization for cloud resource updates. The metadata ingestion management system can invoke a crawler configured for the purposes of the metadata ingestion management system. Since an organization likely uses multiple CSPs, the organization will specify the CSPs to the crawler. The CSPs can be specified by domain name and or URLs. The crawler indexes the web pages with timestamps and compact representations of content for comparisons to determine when change updates occur. The timestamps and indexing also inform the crawler when new content updates occur, such as a new web page or sub-domain is offered. The crawling is ongoing or periodic, and can also be done on demand.

At block 203, the metadata ingestion management system extracts cloud resource metadata from the crawled pages corresponding to detected updates while maintaining associations of cloud resource identifiers. More specifically, the metadata ingestion management system extracts information from the API specifications about the API calls. The extracted API information can include query, path, body, and other parameters along with their descriptions. As an example, the metadata ingestion management system discovers a service of a CSP offers a new API function for a resource and extracts the information about the new function and descriptions of the fields of the function. For an update, the metadata ingestion management system examines the web page or document to extract cloud resource information including cloud resource attributes and corresponding descriptions. The metadata ingestion management system associates any extracted cloud resource attribute and attribute description with an identifier of the cloud resource. In the case of multiple CSPs, the metadata ingestion management system also maintains an association with an identifier of the CSP identifier.

At block 205, the metadata ingestion management system classifies the cloud resource attributes as security related or not security related. The metadata ingestion management system runs a local or on-premise model or uses a model provided as a service. The metadata ingestion management system uses a model that has the capability to classify the attributes as security related or not security related. The model may have been trained to classify attributes based on labeled training data that includes resource attributes, attribute descriptions, and labels indicating whether the corresponding attribute is security related or not. Examples of the model include an artificial neural network or deep learning network. Embodiments can instead use a foundation model and may further train, for example with fine-tuning, the foundation model to classify cloud resource attributes as related to security or not related to security. This classification can be referred to as security sensitive and security insensitive instead. The description refers to this model as a "classifier" since that is how it is used in the metadata ingestion management system regardless of the possibility of other capabilities. For classification, a feature vector is generated for each resource attribute and corresponding description. The metadata ingestion management system indicates the classification in a listing or data structure that also indicates the cloud resource attribute in association with the cloud resource identifier and CSP identifier.

At block 207, the metadata ingestion management system filters for new security related attributes. The filtering removes cloud resource attributes that have been classified as not related to security and those attributes classified as security related but already covered by cloud security/CSPM policies. FIG. 3 provides example operations for block 207. The listing of filtered, discovered security related cloud resource attributes can accumulate until a threshold number has been accumulated. Upon satisfying the threshold, the operations can continue unless the operations for identifying cloud resource attributes lacking coverage occurs asynchronously with respect to discovery. In that case, satisfying a criterion for either or both sets of cloud resource attributes can lead to the merging of the lists.

At block 209, the metadata ingestion management system identifies cloud resource attributes that lack coverage based on organization usage. While an organization may have a gap in knowledge of which cloud resources are being used or form part of the cloud footprint of the organization, various data sources can be accessed to identify cloud resources actively being used and not covered. FIG. 4 provides example operations for block 209.

At block 211, the metadata ingestion management system prioritizes the cloud resource attributes for ingestion. Prioritization is informed by priority factors or weights that can be hardcoded and/or be configurable. As an example, a factor or weight can be assigned to prioritize newly discovered security related attributes over other attributes that lack coverage. The organization can then configure factors/weights by data source, for example prioritizing attributes indicated in audit logs over ingestion requests. Furthermore, prioritization can be hierarchical. For instance, the metadata ingestion management system can assign priority values based on source of the attribute-discovered from crawling, audit log, or ingestion request queue. The metadata ingestion management system can then examine relevant metadata. For instance, the metadata ingestion management system can examine an ingestion request for an urgency or priority value assigned within that ingestion request system and use that priority value as a coefficient to be applied to the source-based priority value. As another example, creation of a policy and the corresponding cloud resource can be given a higher prioritization weight than a deletion action when both are found in an audit log. This would reflect an organization considering the policy creation to be of higher priority since the action directly relates to security. The metadata ingestion management system can use role of a submitter or frequency of occurrence in the usage data source to further modify or inform prioritization. The metadata ingestion management system assigns a priority value to each of the cloud resource attributes ascertained from the usage data sources and from the filtered security related attributes discovered from crawling. These can be augmented or further adjusted for relative ranking of the cloud resource attributes. In some cases, a threshold can be applied as a cutoff depending upon ingestion capacity. Assuming metadata ingestion for cloud security is run at defined intervals, the cut off limit can be set based on the ingestion capacity of the time interval.

At block 213, the metadata ingestion management system begins processing each prioritized cloud resource attribute for ingestion. The metadata ingestion management system iterates through the cloud resource attributes according to the prioritization values that have been assigned to the cloud resource attributes.

At block 215, the metadata ingestion management system generates and validates an ingestion template for the selected cloud resource attribute. Generation of the ingestion template involves loading a partially defined ingestion template and replacing or filling placeholders with information that identifies the CSP, the cloud resource, the attribute, and a location for obtaining metadata about the cloud resource attribute. The ingestion template is also set to indicate a transformation operation to apply to the obtained metadata to be compatible for loading into the database or repository (e.g., data lake or warehouse) used as a source for CSPM. The metadata ingestion management system processes each ingestion template with a validation engine that ensure the ingestion template does not include syntax errors and is compatible with the system that will execute the ingestion template. The validation engine can check parameters, such as region, resource name, resource identifier, and check that tags are correctly fetched. The validation engine may create a resource in a test account and run the template on the resource in the test account and validate that running the template fetched metadata correctly. The validation engine can also determine whether an API call in a template is dependent upon a response to another API call. In that case, the validation engine can stitch together API calls to satisfy dependencies.

At block 217, the metadata ingestion management system submits the validated ingestion template for execution. For example, based on the prioritization that has been assigned to the cloud resource attributes the metadata ingestion management system may invoke an ETL process and pass the ETL process the ingestion template. As another example, the metadata ingestion management system can write the ingestion template to a destination that is processed by an ingestion team or automated ingestion process. Referring back to the example of an existing service of a CSP offering a new API function, a template would be generated to call the new function to obtain metadata about the resource corresponding to the new function.

FIG. 3 is a flowchart of example operations to filter for new security related attributes. The security related attributes referred to as "new" are likely new offerings from a CSP. However, extent of new will depend upon how the organization configures specification crawling. The example operations begin after newly discovered cloud resource attributes have been classified with respect to security.

At block 301, the metadata ingestion management system removes cloud resource attributes classified as not related. At block 303, the metadata ingestion management system searches a database/repository of cloud security policies or CSPM policies for matches with the security related cloud resource attributes. If a cloud resource attribute is already indicated in an existing cloud security policy, then the cloud resource attribute is covered. At block 305, the metadata ingestion management system removes each security related cloud resource attribute with a match in a CSPM policy.

FIG. 4 is a flowchart of example operations for identifying cloud resource attributes used by an organization that lack coverage. An organization will have configured the metadata ingestion management system with the data sources corresponding to usage. Access by the metadata ingestion management system of the data source can vary depending upon the data source. For example, one data source may be accessed with API calls while another data source is accessed by an event notification system. In some cases, the metadata ingestion management system can maintain a duplicate of a usage data source to maintain the usage data according to metadata ingestion management. For example, the metadata ingestion management system may subscribe to events in a ticketing system and maintains its own queue of tickets to separate ticket processing from ingestion management.

At block 401, the metadata ingestion management system begins processing each data source that has been indicated for cloud resource usage. While presented as a serial process, implementations can process usage data in parallel. For instance, threads or processes can be launched per data source.

At block 403, the metadata ingestion management system retrieves usage data from the data source. The metadata ingestion management system may retrieve messages, records, tickets, etc., depending on the data source.

At block 405, the metadata ingestion management system parses the retrieved usage data to extract cloud resource identifiers and associated attributes. Since the data source is known, the metadata ingestion management system can read or be configured to read formatting information about the data source. The formatting information can guide the parsing. Embodiments can also use keywords that map to cloud resources. The extracted cloud information identifying the cloud resource attributes is used to form the list of cloud resource attributes for prioritizing. As mentioned when discussing prioritization, the metadata ingestion management system can be programmed to extract additional data that information the prioritization (e.g., role of submitter, urgency indicator, etc.).

At block 407, the metadata ingestion management system determines whether there is an additional resource usage data source to process. If so, operational flow returns to block 401. If there is no other specified usage data source, the operational flow for FIG. 4 ends. The metadata ingestion management system either combines the list of filtered new security related attributes with the attributes identified as lacking coverage or adds the cloud resource attributes identified as lacking coverage to the list of filtered new security related attributes.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations for identifying cloud resource attributes that lack coverage can be ongoing or in parallel with the operations for discovering and filtering cloud resource attributes. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
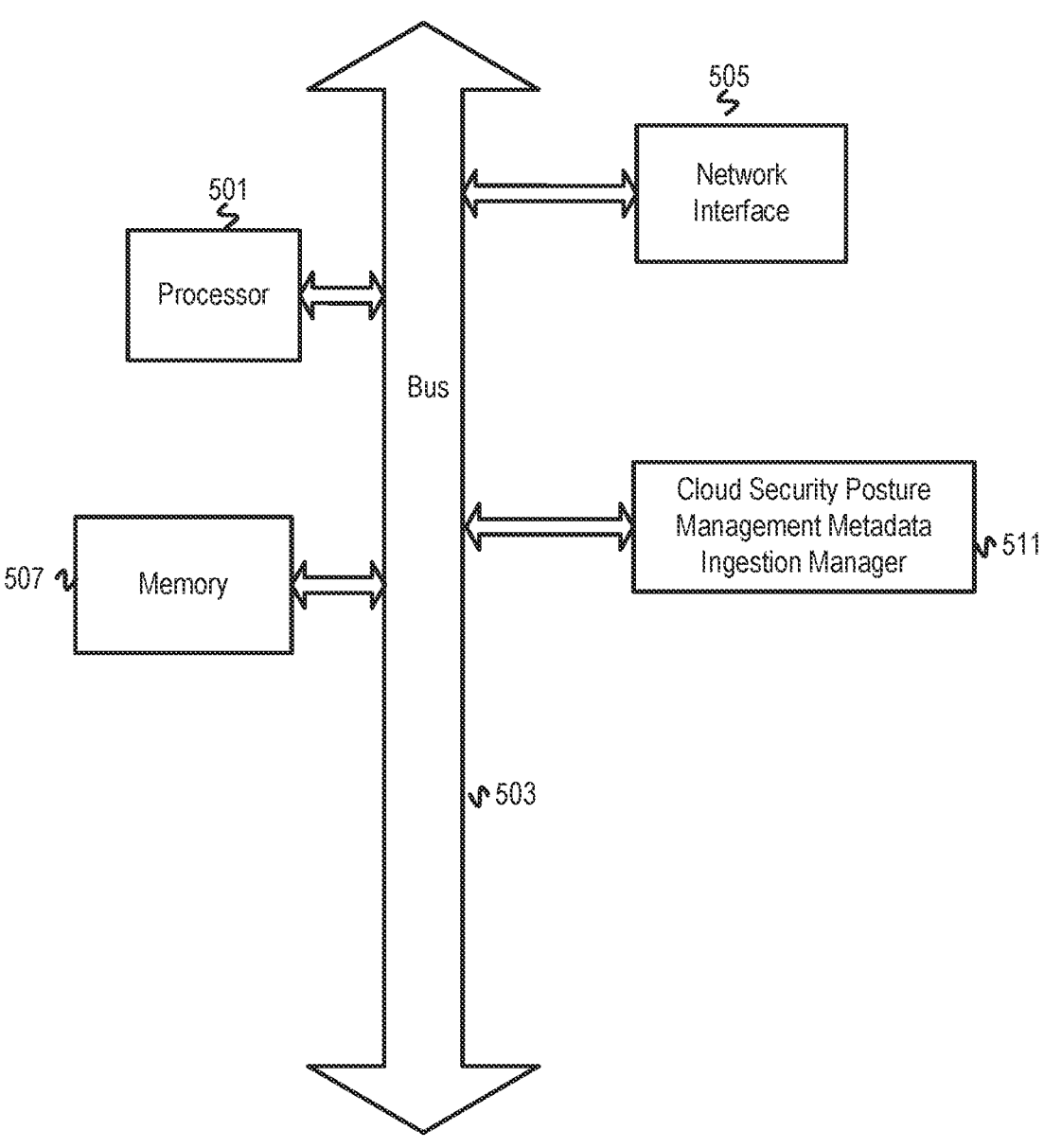
FIG. 5 depicts an example computer system with a CSPM metadata ingestion manager.

FIG. 5 depicts an example computer system with a CSPM metadata ingestion manager. The computer system includes a processor 501 (possibly including multiple processors, multiple cores, multiple nodes, and/or implementing multithreading, etc.). The computer system includes memory 507. The memory 507 may be system memory or any one or more of the above already described possible realizations of machine-readable media. The computer system also includes a bus 503 and a network interface 505. The system also includes a CSPM metadata ingestion manager 511. The CSPM metadata ingestion manager 511 includes or interacts with a crawler configured to detect updates to CSP specifications and parse detected updates for cloud resource attributes and attribute descriptions. The CSPM metadata ingestion manager 511 also includes or interacts with a model (e.g., trained classifier or foundation model) for classifying cloud resource attributes as security related/sensitive or not. After filtering out the discovered cloud resource attributes not security sensitive and then filtering out the discovered security sensitive cloud resource attributes that are already indicated in a CSPM policy of an organization, the CSPM metadata ingestion manager 511 determines actively used cloud resources that lack coverage and aggregates them with the filtered, discovered security sensitive cloud resource attributes and prioritizes them. The CSPM metadata ingestion manager 511 then populates ingestion templates for the aggregated cloud resource attributes and submits them for execution according to the prioritization. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

The invention claimed is:

1. A method comprising:

crawling application programming interface specifications of one or more cloud service platforms to extract attributes and attribute descriptions and maintaining an association between the extracted attributes and indications of corresponding first cloud resources;

for each extracted attribute of the first cloud resources, prompting a language model to classify whether the attribute is relevant to cybersecurity based on the attribute and the corresponding attribute description;

filtering out those of the attributes classified as relevant to cybersecurity that have been previously observed for an organization which yields discovered security attributes of the first cloud resources;

determining second cloud resources of the organization that lack cloud security coverage based on data of the organization corresponding to usage;

determining prioritization for cloud security coverage update among the second cloud resources determined as lacking cloud security coverage and those of the first cloud resources corresponding to the discovered security attributes, wherein the prioritization is based, at least partly, on the usage and vulnerability; and ingesting into a cloud security posture management (CSPM) database metadata of the first and second cloud resources to update the cloud security coverage based on the determined prioritization.

2. The method of claim 1, further comprising determining a priority value for each distinct cloud resource of the first and second cloud resources based on weights assigned to factors corresponding to discovery and the organization's data, wherein determining prioritization is based on the priority values.

3. The method of claim 1, wherein the organization's data comprise at least one of audit logs, cloud resource usage within the organization, pending ingestion requests, policy author data, and security sensitivity of the discovered attributes.

4. The method of claim 3 further comprising classifying with a second language model the security sensitivity of each of the discovered attributes.

5. The method of claim 1 further comprising generating an ingestion template for each of the cloud resources according to the prioritization, wherein generating the ingestion template comprises populating metadata request parameters with first values that identify a source for metadata of the cloud resource, the cloud service platform, and a permission for the request and populating transform parameters with second values that indicate a transform operation to apply to obtained metadata and a command to update the cloud security posture management database with the transformed metadata, wherein ingesting the cloud security posture management database metadata is based on the ingestion templates.

6. The method of claim 5 further comprising running the ingestion templates on a schedule based, at least in part, on the prioritization.

7. The method of claim 1, wherein filtering out those of the attributes classified as relevant to cybersecurity that have been previously observed comprises filtering out those of the cybersecurity relevant attributes that occur in a set of one or more templates for metadata ingestion into the cloud security posture management database, wherein the ingesting the metadata into the cloud security posture management database comprises running the set of templates.

8. A non-transitory machine-readable medium having program code stored therein, the program code comprising instructions to:

extract attributes and attribute descriptions from crawling application programming interface (API) specifications of one or more cloud service platforms and track correspondence between first cloud resources and the extracted attributes;

for each extracted attribute of the first cloud resources, prompt a language model to classify whether the attribute is relevant to cybersecurity based on the attribute and the corresponding attribute description;

filter out each of the attributes classified as not relevant to cybersecurity and each of the attributes classified as relevant to cybersecurity that has been previously observed for an organization, which yields discovered security attributes of the first cloud resources;

determine second cloud resources of the organization that lack cloud security coverage based on data of the organization corresponding to usage;

determine prioritization for cloud security coverage update among the second cloud resources and those of the first cloud resources corresponding to the discovered security attributes, wherein the prioritization is based, at least partly, on the usage and vulnerability; and ingest into a cloud security posture management database (CSPM) metadata of the first and second cloud resources to update the cloud security coverage based on the determined prioritization.

9. The non-transitory machine-readable medium of claim 8, wherein the program code further comprises instructions to determine a priority value for each distinct cloud resource of the first and second cloud resources based on weights assigned to factors corresponding to discovery and the organization's data, wherein determination of prioritization is based on the priority values.

10. The non-transitory machine-readable medium of claim 8, wherein the organization's data comprise at least one of audit logs, cloud resource usage within the organization, pending ingestion requests, policy author data, and security sensitivity of the discovered attributes.

11. The non-transitory machine-readable medium of claim 10, wherein the program code further comprises prompting a second language model to classify the security sensitivity of each of the discovered attributes.

12. The non-transitory machine-readable medium of claim 8, wherein the program code further comprises instructions to generate an ingestion template for each of the cloud resources according to the prioritization, wherein the instructions to generate the ingestion template comprise instructions to populate metadata request parameters with first values that identify a source for metadata of the cloud resource, the cloud service platform, and a permission for the request, wherein the instructions to ingest the cloud security posture management database metadata comprises commands to run the ingestion templates and update the cloud security posture management database with the transformed metadata produced from running the ingestion templates.

13. The non-transitory machine-readable medium of claim 12, wherein the instructions to generate an ingestion template for each cloud resource comprise instructions to populate transform parameters with second values that indicate a transform operation to apply to obtained metadata.

14. The non-transitory machine-readable medium of claim 8, wherein the instructions to filter out each of the attributes classified as not relevant to cybersecurity and each of the attributes classified as relevant to cybersecurity that have been previously observed comprise instructions to filter out those of the cybersecurity relevant attributes that occur in a set of one or more templates for metadata ingestion into the cloud security posture management database, wherein the instructions to ingest the metadata into the cloud security posture management database comprise instructions to run the set of templates.

15. An apparatus comprising:

a hardware processor; and a non-transitory machine-readable medium having instructions stored thereon which are executable by the processor to cause the apparatus to, extract attributes and attribute descriptions from crawling application programming interface (API) specifications of one or more cloud service platforms and track correspondence between first cloud resources and the extracted attributes;

for each extracted attribute of the first cloud resources, prompt a language model to classify whether the attribute is relevant to cybersecurity based on the attribute and the corresponding attribute description;

filter out each of the attributes classified as not relevant to cybersecurity and each of the attributes classified as relevant to cybersecurity that has been previously observed for an organization, which yields discovered security attributes of the first cloud resources;

determine second cloud resources of the organization that lack cloud security coverage based on data of the organization corresponding to usage;

determine prioritization for cloud security coverage update among the second cloud resources and those of the first cloud resources corresponding to the discovered security attributes, wherein the prioritization is based, at least partly, on the usage and vulnerability; and ingest into a cloud security posture management (CSPM) database metadata of the first and second cloud resources to update the cloud security coverage based on the determined prioritization.

16. The apparatus of claim 15, wherein the machine-readable medium further has stored thereon instructions executable by the processor to cause the apparatus to determine a priority value for each distinct cloud resource of the first and second cloud resources based on weights assigned to factors corresponding to discovery and the organization's data, wherein determination of prioritization is based on the priority values.

17. The apparatus of claim 15, wherein the organization's data comprise at least one of audit logs, cloud resource usage within the organization, pending ingestion requests, policy author data, and security sensitivity of the discovered attributes.

18. The apparatus of claim 17, wherein the machine-readable medium further has stored thereon instructions executable by the processor to cause the apparatus to prompt a second language model to classify the security sensitivity of each of the discovered attributes.

19. The apparatus of claim 15, wherein the machine-readable medium further has stored thereon instructions executable by the processor to cause the apparatus to generate an ingestion template for each of the cloud resources according to the prioritization, wherein the instructions to generate the ingestion template comprise instructions to populate metadata request parameters with first values that identify a source for metadata of the cloud resource, the cloud service platform, and a permission for the request, wherein the instructions to ingest the cloud security posture management database metadata comprise instructions to run the ingestion templates and update the cloud security posture management database with the transformed metadata produced from running the ingestion templates.

20. The apparatus of claim 15, wherein the instructions to filter out each of the attributes classified as not relevant to cybersecurity and each of the attributes classified as relevant to cybersecurity that have been previously observed comprise instructions executable by the processor to cause the apparatus to filter out those of the cybersecurity relevant attributes that occur in a set of one or more templates for metadata ingestion into the cloud security posture management database.

* * * * *